United States Patent [19]

Escano et al.

[11] Patent Number: 5,196,057
[45] Date of Patent: Mar. 23, 1993

[54] PLAIN PAPER INK FOR DROP-ON-DEMAND PRINTING

[75] Inventors: Nelson Z. Escano, Cincinnati; Sandra K. Brewer, Canton, both of Ohio

[73] Assignee: Eastman Kodak Company, Rochester, N.Y.

[21] Appl. No.: 251,080

[22] Filed: Sep. 30, 1988

Related U.S. Application Data

[63] Continuation-in-part of Ser. No. 129,573, Dec. 7, 1987, abandoned.

[51] Int. Cl.$^5$ ............................................. C09D 11/02
[52] U.S. Cl. .................................. 106/22R; 106/20D; 346/1.1
[58] Field of Search ................... 106/20, 22, 30; 260/DIG. 38; 523/160; 346/1.1

[56] References Cited

U.S. PATENT DOCUMENTS

| | | | |
|---|---|---|---|
| 3,846,141 | 11/1974 | Ostergren et al. | 106/22 |
| 4,176,361 | 11/1979 | Kawada et al. | 346/1.1 |
| 4,184,881 | 1/1980 | Bradley | 106/20 |
| 4,239,543 | 12/1980 | Beasley | 106/22 |
| 4,299,630 | 11/1981 | Hwang | 106/22 |
| 4,352,691 | 10/1982 | Owatari et al. | 106/20 |
| 4,381,946 | 5/1983 | Uehara | 106/22 |
| 4,383,859 | 5/1983 | Moore et al. | 106/22 |
| 4,399,443 | 8/1983 | Yasufuku et al. | 346/1.1 |
| 4,567,213 | 1/1986 | Bhatia et al. | 523/160 |
| 4,589,000 | 5/1986 | Koto et al. | 346/140 R |

FOREIGN PATENT DOCUMENTS

| | | |
|---|---|---|
| 56-95961 | 8/1981 | Japan . |
| 56-147870 | 11/1981 | Japan . |
| 58-142954 | 8/1983 | Japan . |
| 59-93765 | 5/1984 | Japan . |
| 62-11781 | 1/1987 | Japan . |
| 58-142953 | 8/1988 | Japan . |

*Primary Examiner*—Amelia Burgess Yarbrough
*Attorney, Agent, or Firm*—Dana M. Schmidt

[57] ABSTRACT

There is described an aqueous ink of the type useful for drop-on-demand printers, that is, comprising more than 40 weight % humectant and a compatible dye. The ink is improved by the addition of from about 0.5 to about 10 weight % of a non-ionic, acetylenic diol surfactant or a dioctyl sulfosuccinate surfactant, effective to provide high quality image properties when printed on plain paper. Without the surfactant, such high quality image is not achieved on the plain paper.

8 Claims, No Drawings

PLAIN PAPER INK FOR DROP-ON-DEMAND PRINTING

This is a continuation-in-part of application Ser. No. 129,573, filed Dec. 7, 1987, now abandoned.

FIELD OF THE INVENTION

This invention relates to printing inks, and more particularly to such inks as are used in drop-on-demand ink jet printers.

BACKGROUND OF THE INVENTION

Coated paper has been the only material used in the past for thermal drop-on-demand printing, to overcome feathering. The feathering is particularly aggravated by the presence of the excessive (greater than 40 weight %) amounts of humectant needed to reduce "crusting-over" and relaxation times in the print head. As used herein, "thermal drop-on-demand printing" means printers that generate drops only when printing is needed, in response to thermal energy. Thus, for example, Hewlett-Packard's "Think Jet Black Ink" printed from drop-on-demand printers uses specially coated paper. It is not acceptable for use on plain paper, because the optical density is insufficient (no greater than about 0.75) when printed in a standard test pattern. This density, or lack of it, is not due to the amount of colorant present, since it can be shown that a greater amount of the colorant used by this ink gives no appreciable improvement in optical density.

The coatings needed for these specialty papers now used for drop-on-demand printing, are frequently calcium carbonate-based or silicate-based. In any event, such coatings usually result in paper costs that are two to five times as much as plain paper. The cost has not been due just to materials, but also to the process of achieving the coating. In addition to cost, the need to use specialty papers has been a substantial inconvenience, since the customer cannot use just any paper at hand. Furthermore, the recommended specialty papers are difficult to obtain in foreign countries.

Thus, ever since thermal drop-on-demand printing has been available, there has been a substantial need for an ink that does not require coated papers, but is useful on plain paper, even when the ink has greater than 40 weight % penetrant or humectant.

Surfactants have long been used with ink jet inks, for various purposes. Clearly, however, none of these have been found, heretofore, to be effective to render the thermal drop-on-demand ink printable on plain paper.

A typical example of surfactants used in inks is that shown in U.S. Pat. No. 4,184,881, wherein Surfynol 485, one of the acetylenic diols found useful herein, is listed as being useful as a humectant, "in the absence of any glycol". That patent is silent about using this surfactant to allow printing of drop-on-demand ink on plain paper. That is not surprising since the use of 14 weight % Surfynol 485, in the absence of any of the preferred glycol humectants of this invention, is shown hereinafter as not being effective to allow printing in a drop-on-demand printer. That is, it provides insufficient glycol or other humectant.

Other inks have been taught that use high levels of humectants, such as glycols. These humectants are particularly needed, as noted above, in such large quantities for drop-on-demand printers, since the ink is retained in a quiescent state for so long between demands. Without the high weight % of humectant, the printhead crusts over. A representative patent illustrating an ink with such properties is shown in U.S. Pat. No. 4,239,543. However, this patent makes no mention of the use of plain paper, nor does it suggest that acetylenic diols should be added to the humectants already present, for any reason. In fact, plain paper is not acceptable for such ink, due to feathering caused by the high weight % of humectant.

Finally, yet another reason mitigates against the addition of a surfactant to an ink already heavily loaded with a humectant. That is, it is difficult to find a surfactant that accomplishes control of the drop appearance on plain paper, without adversely affecting the ink's property in some other respect, such as the ink's drying time.

SUMMARY OF THE INVENTION

We have discovered that the addition of a small amount of particular surfactants to an ink already containing greater than 40 weight % humectant (and a dye), renders that ink, ink jet printable onto plain paper. This is particularly surprising, since the surfactants can also be considered to be humectants, and an ink containing more than 40 weight % humectant already present (as taught by the prior art), would not be expected to show much difference when from 0.5 to 10 weight % of an additional humectant is added. (As used herein, "ink-jet printable onto plain paper" means, in a fashion producing a high quality image, as more specifically defined by the properties of the printed ink hereinafter set forth.)

More specifically, there is provided in one aspect of the invention, an aqueous ink useful for printing on plain paper with a thermal drop-on-demand printer, the ink comprising a humectant comprising more than 40 weight % of the total ink composition. The ink is improved in that it further includes a nonionic, acetylenic diol surfactant or a dioctyl sulfosuccinate surfactant, effective, when used in amounts of from about 0.5 to about 10 weight % of the total ink composition, to provide a drying time less than about five seconds, a dot size having an average equivalent circular diameter of at least about 0.25 mm, and an optical density of at least 0.80; all when printed in accordance with a specified test. That test is on #4 xerographic bond paper having a roughness of between about 120 and 260 ml/min., an air permeability of between 200 and 500 ml/min., a moisture content of between about 3.9 and about 5.5%, a resin content of about 0.9%, a pH value of between about 7 and about 9, and a Cobb $C_{60}$ value of between about 15 and about 30 g/m$^2$, using a print head having orifices spaced to print about 37.8 dots/cm (96 dots/inch) and constructed to generate dots having an average equivalent circular diameter of from about 0.25 mm to about 0.29 mm when printing with Hewlett-Packard Think Jet Black Ink on the #4 bond paper.

In another aspect of the invention, there is provided a method of printing ink onto plain paper. The method comprises adding to an ink comprising a compatible dye and more than 40 weight % by weight of a humectant, a nonionic, acetylenic diol surfactant in an amount of from about 0.5 to about 10 weight %, the surfactant being selected on the basis of the aforementioned specific test; and then printing such ink on demand onto such plain paper, by ejecting it by thermal energy.

Thus, it is an advantageous feature of the invention that an ink suitable for drop-on-demand printers, having more than 40 weight % humectant, is printable on plain paper with the high quality print standards herein set forth.

It is a related advantageous feature of the invention that the ink of this invention allows a drop-on-demand printer to print on less expensive, ordinary paper of the type that any office is likely to have on hand.

Other advantageous features will become apparent upon reference to the following detailed Description of the Preferred Embodiments.

DESCRIPTION OF THE PREFERRED EMBODIMENTS

The invention is particularly described in connection with an ink used in thermal drop-on-demand printers, on a particular grade of plain paper. In addition, it is useful in other kinds of printers, and on all kinds of plain papers or even specialty coated papers. However, its primary advantage resides in its use on plain papers. "Plain paper" is used herein as in the printing trade, to refer to any paper that prints similarly to xerographic bond, and is not specially coated or surface-treated as has been done for specialty paper. However, it is not limited to just xerographic bond, since the latter requires properties such as surface resistivity that are believed to be not relevant.

For the purposes of defining the limits of print quality acceptability, a test is recited based on the ink's performance on a particular xerographic bond paper, namely #4 bond paper having the specified roughness, air permeability, moisture content, resin content, pH value and Cobb $C_{60}$ value, set forth in the above Summary. If the ink in question meets those specified performance levels on that paper, and features the humectant and dye as specified, then it qualifies as an ink of this invention, regardless of the paper it is actually used on.

As to the ink composition, it comprises a compatible dye, greater than 40 weight % humectant, and a surfactant taken from a specific class. (All weight % are expressed based on the total ink composition.)

More specifically, as to the humectant, in drop-on-demand printers, the high amounts of humectant are selected to insure that the viscosity of the ink is maintained between about 5.5 and 6.5 centipoise. (All viscosities herein are measured at 24° C.) Failure to have a viscosity as high as 5.5 tends to produce undesired cross-talk, in such printers. Viscosity in excess of about 6.5 requires too much energy to eject the ink. Such viscosities of about 5.5-6.5 centipoise in turn depend on the amount of humectant that is present. Generally, the humectant should constitute more than 40 weight % of the ink to meet the viscosity demands. The most preferred amounts are from 50 to about 70 weight %. Exactly how much depends on the type of humectant and the viscosity of the rest of the ink composition. This depends partly on which dye is used.

The following alkanediols are examples of useful humectants for the invention: Ethylene glycol; 1,2-propanediol; and 1,3-propanediol; with ethylene glycol being most preferred. 1,4-Butanediol is unacceptable as it tends to precipitate the dye or dye admixture.

As to the compatible dye, as is explained in commonly owned U.S. application Ser. No. 919,522, filed Oct. 16, 1986, by R. Botros, entitled Non Crusting Ink Containing Large Amounts of Humectant, it has been possible to identify dyes which are compatible with such large amounts of humectants, that is, which do not presipitate out or form a crust when exposed to air. Compatibility is defined to mean, freedom from precipitates as determined by the humectancy test hereinafter set forth. Reactive dyes are not suitable, as they tend to react with atmospheric moisture while on the printed page, and change color. Black of course is preferred for the monochrome printing so characteristic of the business office.

The humectancy test comprises the following steps:
1) Depositing 5 gm of the complete ink into an aluminum dish so as to expose to the air a surface of the ink that is about 30 cm$^2$,
2) Leaving the deposited ink so exposed for 1 month at a temperature of abou 24° C., and
3) Examining the results to ascertain that the ink is totally clear of deposit or crust formation. If there is any such formation, the ink is considered a failure.

Any dye that meets the aforesaid "non-crusting" test, and also satisfies the high quality image criteria hereinafter listed, is useful in this invention. Particularly preferred examples include a liquid mixture of Liquid Direct Blue C.I. 279 admixed with Direct Red C.I. 236 and Direct Yellow C.I. 107, in the ratio of 3.53/1.35/1.0, and Mobay Special Black SP liquid ink. A preferred ink composition comprises one in which said *liquid* mixture is 25 weight % of the total ink composition. (Dry solids % is unknown, since the dye is supplied as a liquid mixture.) The exact weight % needed for the desired optical density will of course vary, depending on the inherent optical density of the dye. The 25 weight % is preferably used with about 50 weight % ethylene glycol.

Another preferred example of a compatible dye is the dye known in the Color Index as Direct Black No. 154. This dye appears to have the following structural formula:

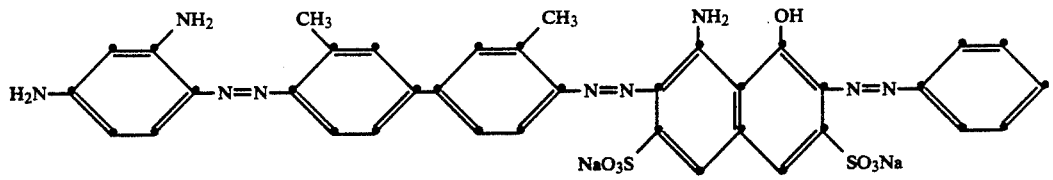

Useful sources of this dye include the dye obtainable from Hodagaya under the tradename Aizen Black 1000-S, and the dye obtainable from Orient under the tradename Water Black 187 LM. This dye is most preferably used at amounts of about 4-6 weight percent, together with 48 weight percent of ethylene glycol, 0.5-10 weight % surfactant and the remainder deionized water. If the Aizen Black 1000-S is used as the source, preferably 4 weight percent of diethylene glycol is also used to eliminate dye deposition on the resistor thick enough to affect print head performance and cause the head to fail.

The Direct Black 154 dye is preferred primarily because it produces immediate results upon start-up. That is, no priming is needed to get the print-head to function properly.

In accordance with the invention, a nonionic, acetylenic diol surfactant or a dioctyl sulfosuccinate surfactant is added to this composition to make it printable with a high quality image on plain paper as herein defined. Any such surfactant is useful, provided it causes the ink to meet the standard of high quality image on plain paper.

To ascertain whether a particular surfactant raises the quality of print to a level permitting an ink containing it to be used on plain paper, the following test is conducted:

In an appropriate drop-on-demand print head construction, that is, one having orifices spaced to print 37.8 dots/cm (96 dots/inch) *and* proven to function properly (as explained below), the ink is inserted and ejected so as to print on #4 xerographic paper as defined herein. The results are examined for drying time, dot size as measured by average equivalent diameter (as hereinafter defined), and optical density. As to these, if the drying time is less than 5 sec., the average equivalent circular diameter (defined below) is at least about 0.25 mm, and the optical density is at least 0.8, then the surfactant qualifies.

Not every drop-on-demand print head will qualify as a proven test apparatus. The reason is that because of design or faulty construction, some may not be capable of producing an average equivalent diameter of the proper size even with the best of acetylenic diol surfactants. Thus, the test should be done using a drop-on-demand print head (such as the Hewlett-Packard "Think Jet" print head) that will produce an average equivalent circular diameter of from about 0.25 mm to about 0.29 mm when printing with the Hewlett-Packard "Think Jet Black Ink". Alternatively, the print head is constructed properly if it prints an average equivalent circular diameter of at least about 0.16 mm when using the black ink herein identified as preferred, but *without* the surfactant.

As used herein, "average equivalent circular diameter" is an average taken over 30 dots, of the equivalent circular diameters (ECD). "ECD" is determined for each dot by the following method using an "Omnicon" TM image analyzer: the area of the dot is measured and the ECD calculated from the equation ECD=$(4A/\pi)^{\frac{1}{2}}$, where A=area. The error in this determination is believed to be ±0.025 mm.

Particular examples of acetylenic diol surfactants that have been found to provide these properties include certain Surfynol surfactants manufactured by Air Products & Chemicals. More specifically, "Surfonyls GA, 82, 465, 485 & 136" TM and "Aerosol OT 75" TM perform acceptably, with Surfonyl GA and 465 being the most preferred. Thus, the most preferred Surfonyl surfactants have a specific gravity of from about 1.03 to about 1.05, at 25° C. Except as noted herein, the mechanism which causes some surfactants to be effective as described, and others not, is not understood.

It is difficult to obtain complete chemical characterization of surfactants, because in most instances they are treated as trade secrets by the proprietor. The following information is accertainable from the trade literature distributed by the manufacturer, and from the apparent properties of the surfactant:

Surfynol GA—This is a blend of acetylenic diols, possibly based upon Surfynol 104E, discussed below, with at least a dispersant added for greater water solubility. It is a clear, straw yellow liquid at room temperature, with a mild fatty acid odor, a freezing point of −5° C., a flash point of >90° C., a cloud point (5% solution) of 57° C., a Brookfield viscosity (25° C.) of 140 cps, a pH (5% solution) of 6.5, specific gravity (25° C.) of 1.051, surface tension (0.1%) of 33 dynes/cm, and HLB value of 13.

Surfynol 104E—This is not useful by itself, but is listed only as background for Surfynols GA and 465. It is not very water soluble, as it is a white waxy acetylenic diol dissolved in ethylene glycol. The diol has the chemical formula

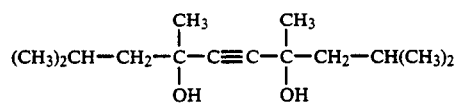

It is dissolved 50% by weight, to form a light yellow liquid having an HLB of from 4 to 5, specific gravity of 0.999 at 25° C., freezing point <0° C., and surface tension of 36.2 dynes/cm for a 0.1 weight % aqueous solution at 25° C.

Surfynol 82—This is a white flaky solid having the chemical formula

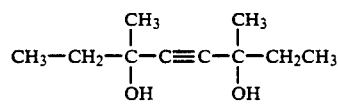

It has a boiling point of 222° C., melting point of 49°–51° C., specific gravity (20/20) of 0.033, and a surface tension of 30.7 dynes/cm for a 5 weight % solution in water at 25° C.

Surfynol 465—This is an ethoxylated version of Surfynol 104E, wherein the two —OH groups have been ethoxylated by N moles of ethylene oxide, wherein N is 10. Its specific gravity is 1.038 at 25° C., its viscosity at 25° C. is 100-140 cps, its pour point is −17° C., its cloud point in a 5% solution is 63° C., and its pH is 6-8.

Surfynol 485—This is the same as 465, with the same properties, except that the moles N of ethylene oxide are 30, to give a spec. gravity of 1.080, a viscosity of 270-310 at 25° C., a pour point of −7° C., and a cloud point in a 5% solution of >100° C.

Surfynol 136—This is a clear straw yellow liquid of unspecified chemical formula, having a density of 1.055 g/cc at 25° C., a freeze point of −10° C., and a flash point of about 93° C.

For comparative purposes, a Surfynol surfactant that is not satisfactory is Surfynol PC, as it is too water-insoluble to be useful.

Aerosol OT 75—This is a sodium dioctylsulfosuccinate anionic surfactant supplied by *American Cyanamid*. In contrast, it has been found that Aerosol MA 80, made by the same manufacturer as OT 75, and comprising anionic sodium dihexylsulfosuccinate, does not work.

There is one other factor that needs to be considered, and that is a good start-up ability. That is the ability of the ink to start printing without excessive priming, after having been idle for four days at 40° C. in 15% R.H. "Excessive" as used herein means, perfect line production of any of the first five lines, only by priming the head more than once. "Priming" means, contracting the bladder so that a drop of ink appears on the orifice plate. This start-up factor was satisfied by all the surfactants of this invention, as set forth hereinafter, although in some cases a lesser amount of the surfactant than the preferred amount can produce a failure of "start-up".

Of these Surfynols, the following weight % have been found to be particularly effective in meeting the above-listed test criteria for a high quality print image, and good start-up.

Surfynol GA—1 to 10 weight %
Surfynol 82—10 weight %
Surfynol 465—1 to 10 weight %
Surfynol 485—5 to 10 weight %
Surfynol 136—2 weight %

An additional, optional addendum to the ink is a corrosion inhibitor, such as any aromatic benzotriazole, in an amount of from 0 to 0.5 weight %.

Apart from optional addenda, the remainder of the ink composition is water.

EXAMPLES

The following examples further illustrate the scope of the invention.

To demonstrate that in fact the noted Surfynol surfactants do in fact meet the specific test called for, the following inks were prepared:

| Component | Weight % |
| --- | --- |
| Dye - Liquid Direct Blue C.I. 279 admixed with Direct Red C.I. 236 with Direct Yellow C.I. 107 as described above to produce black | 25 |
| Humectant - Ethylene Glycol | 48 |
| Surfactant - A Surfynol of Table I | various |
| Corrosion inhibitor - an aromatic benzotriazole | 0.2 |

These inks were placed into a proven drop-on-demand print head, namely a Hewlett-Packard "Think Jet" print head of 37.8 dots/cm, shown to produce an average equivalent circular diameter of from about 0.25 mm to about 0.29 mm when printing with the Hewlett-Packard "Think Jet Black Ink." The ink was ejected by thermal energy conventionally generated as "drop-on-demand", onto Xerox 4024DP #4 Bond paper. This paper was selected as being representative of the bond paper falling within the criteria set forth above. That is, the Xerox 4024DP #4 Bond Paper has many specified properties, but the ones most relevant to ink jet printing are the printing properties, as follows: roughness=120 to 250 ml/min on the felt side (preferably 160), and 140 to 260 ml/min on the wire side (preferably about 200); air permeability=450 ml/min within a range of 200 to 500 ml/min; moisture content of 4.7% within a range of 3.9 to 5.5%; resin content=0.9%; pH value of between 7 and 9%; and Cobb $C_{60}$ (water absorption)=20 g/m$^2$ with a range of 15 to 30 g/m$^2$. Thus, although any #4 bond xerographic paper falling within the ranges set forth in the Summary is useful for the test, Xerox brand 4024DP is particularly useful and is the one tested as set forth hereinafter in the examples.

As a control, the same ink as described above was used, but with no surfactant whatsoever Comparative examples (hereinafter, "Comp.Ex.") were also tested, and generally these comprised the same ink formulation used for Ex. 1-16, except with the noted comparative surfactant being used and/or in the amount used. It is noted that Comp. Ex 12, is Hewlett-Packard "Think Jet" ™ Black ink. This was the H-P ink as it is supplied by the manufacturer.

By way of explanation of such comparative surfactants, "Pluronic L-62" ™ is a nonionic polyol surfactant supplied by BASF, formed by the addition of propylene oxide to the two hydroxy groups of a propylene glycol initiator. "Igepal CA-520" ™ is a nonionic octyphenoxypoly(ethyleneoxy)ethanol surfactant supplied by GAF. "TDA-92" ™ is ethoxylated tridecyl alcohol supplied by Milliken. "Igepal CO-997" ™ is a nonionic nonylphenoxypoly(ethyleneoxy)ethanol surfactant supplied by GAF. "Aerosol AER MA80" ™ is an anionic sodium dihexylsulfosuccinate surfactant supplied by American Cyanamid. "Triton X-114" ™ is an octylphenoxy polyethoxy ethanol supplied by Rohn & Haas. "Tryfac Tryf 5555" ™ is a phosphated aryl ethoxylate in free acid form supplied by Emery.

TABLE I

| Ex. | Surfactant** | Wt % | Optical Density | Dot Size (Equiv. Circular Diam.) | Dry Time |
| --- | --- | --- | --- | --- | --- |
| Control | none | 0 | 0.65 | 0.163 mm | >5 sec. |
| 1 | GA | 2 | 1.02 | 0.317 | <5 sec. |
| 2 | GA | 5 | 0.92 | 0.281$ | <5 sec. |
| 3 | GA | 1.5 | 0.91 | 0.298 | <5 sec. |
| 4 | GA | 10 | 0.87 | 0.262 | <5 sec. |
| 5 | GA | 1 | 0.87 | 0.286 | <5 sec. |
| 6 | GA | 0.5 | 0.80 | 0.266 | <5 sec. |
| 7 | 465 | 7 | 0.96 | 0.314 | <5 sec. |
| 8 | 465 | 10 | 0.88 | 0.298 | <5 sec. |
| 9 | 465 | 3 | 0.86 | 0.279 | <5 sec. |
| 10 | 465 | 2 | 0.90 | 0.282 | <5 sec. |
| 11 | 465 | 5 | 0.86* | 0.288 | <5 sec. |
| 12 | 465 | 1 | 0.87 | 0.261 | <5 sec. |
| 13 | 136 | 2 | 0.88 | 0.269 | <5 sec. |
| 14 | 82 | 10 | 0.87 | 0.263 | <5 sec. |
| 15 | 485 | 10 | 0.82 | 0.28 | <. sec. |
| 16 | 485 | 5 | 0.81* | 0.248*** | <5 sec. |
| 17 | Aerosol OT 75 | 1 | 0.95 | 0.248*** | <5 sec. |
| Comp. Ex. 1 | 82 | 2 | 0.78 | 0.246 | <5 sec. |
| Comp. Ex. 2 | 465 | 0.5 | 0.70 | 0.162 | <5 sec. |
| Comp. Ex. 3 | 485 | 2 | 0.84 | 0.231 | >5 sec. |
| Comp. Ex. 4 | 136 | 10 | 0.87 | 0.235 | <5 sec. |
| Comp. Ex. 5 | Pluronic L-62 | 2 | 0.90 | 0.243 | <5 sec. |
| Comp. Ex. 6 | Igepal CA 520 | 2 | 0.91 | 0.236 | <5 sec. |
| Comp. Ex. 7 | TDA-92 | 2 | 0.86 | 0.225 | <5 sec. |
| Comp. Ex. 8 | Igepal CO-997 | 2 | 0.81 | 0.222 | >5 sec. |
| Comp. Ex. 9 | Aerosol AER MA 80 | 1 | 0.74 | 0.220 | <5 sec. |
| Comp. Ex. 10 | Triton X114 | 1 | 0.88 | 0.220 | <5 sec. |
| Comp. Ex. 11 | Tryfac Tryf 5555 | 2 | 0.82 | 0.219 | <5 sec. |
| Comp. Ex. 12 | H-P "Think Jet" Ink | unknown | 0.75 | 0.25–0.290 | >5 sec. |

*For Ex. 11 and 16, an earlier reading of 0.74 and 0.76, respectively, were found to be in error. These were retested.
**All Surfynol Surfactants unless otherwise specified.
***This value is considered to be within "about 0.25 mm".
$An earlier reading of 0.239 was found to be in error. The value of 0.281 was the result of a retest.

*All Surfynol surfactants unless otherwise noted.

The results of Table I indicate that Comp. Ex. 1, 2, and 9 failed both the optical density and the dot size test. Comp. Ex. 3-8 and 11 failed the dot size test, with Comp. Ex. 3 and 8 also failing the dry time test. Comp. Ex. 12 failed both the optical density and the dry time tests.

On the other hand, each of Ex. 1-16 produced a superior image on the plain paper, that was markedly improved over each of the Comparative Examples.

COMP. EX. 13

Ex. 1 of U.S. Pat. No. 4,184,881 was replicated, wherein 14 weight % of the total ink composition was Surfynol 485, except that the dye, instead of being a mixture of Direct Blue and Direct Black as indicated in the patent, was the black dye of Ex 1 of this application, at 25 weight %. No other humectant was present, as called for by the '881 patent. The result when printed as was done for Ex. 1 of this application, was that the ink failed to provide adequate start-up, as explained above, due to the absence of enough (>40 weight %) humectant. in addition, this ink was a failure because the dot size, measured as above, was 0.181 mm, much less than the required 0.25 mm.

COMPARATIVE EXAMPLES

Reduced Amount of Humectant

Finally, it can be shown that inks prepared with less than 40 weight % humectant, but a correspondingly increased amount of acetylenic diol or dioctyl sulfosuccinate surfactant, will *not* give good start-up as defined above.

The invention has been described in detail with particular reference to preferred embodiments thereof, but it will be understood that variations and modifications can be effected within the spirit and scope of the invention.

What is claimed is:

1. In an aqueous ink useful for printing on plain paper with a thermal drop-on-demand printer, the ink comprising a humectant comprising more than 40 weight % of the total ink composition, and a compatible dye;
   the improvement wherein the ink further includes a nonionic, acetylenic diol surfactant, effective, when used in amounts of from about 0.5 to about 10 weight % of the total ink composition, to provide a drying time less than about five seconds, a dot size having an average equivalent circular diameter of at least about 0.25 mm, and an optical density of at least 0.80; all when printed on #4 xerographic bond paper having the following properties: a roughness of between about 120 and 260 ml/min., an air permeability of between 200 and 500 ml/min., a moisture content of between about 3.9 and about 5.5%, a resin content of about 0.9%, a pH value of between about 7 and about 9, and a Cobb $C_{60}$ value of between about 15 and about 30 g/m$^2$; using a print head having orifices spaced to print about 37.8 dots/cm (96 dots/inch) and constructed to generate dots having an average equivalent circular diameter of from about 0.25 mm to about 0.29 mm when printing with Hewlett-Packard Think Jet Black Ink on said #4 bond paper.

2. An ink as defined in claim 1, wherein said humectant comprises from about 50 weight % to about 70 weight % of the total composition.

3. An ink as defined in claim 1, wherein said surfactant is an acetylenic diol surfactant with a specific gravity from about 1.03 to about 1.05 at 25° C.

4. A method of ink jet printing onto plain paper, an aqueous ink comprising more than 40% by weight of a humectant and a compatible dye, the method comprising the steps of adding to the ink a nonionic, acetylenic diol surfactant, in an amount of from about 0.5 to about 10 weight %, and ejecting the ink on demand by thermal energy in a controlled pattern onto such plain paper,
   said surfactant being selected to be effective to provide to the printed ink a drying time less than about five seconds, a dot size having an average equivalent circular diameter of at least about 0.25 mm, and an optical density of at least 0.80; all when printed on #4 xerographic bond paper having the following properties: a roughness of between about 120 and 260 ml/min., an air permeability of between 200 and 500 ml/min., a moisture content of between 3.9 and about 5.5%, a resin content of about 0.9%, a pH value of between about 7 and about 9, and a Cobb $C_{60}$ value of between about 15 and about 30 g/m$^2$; using a print head having orifices spaced to print about 37.8 dots/cm (96 dots/inch) and constructed to generate dots having an average equivalent circular diameter of from about 0.25 mm to about 0.29 mm when printing with Hewlett-Packard Think Jet Black Ink on said #4 bond paper.

5. A method as defined in claim 4, wherein said humectant comprises from about 50 weight % to about 70 weight % of the total composition.

6. A method as defined in claim 4, wherein said surfactant is an acetylenic diol surfactant with a specific gravity of from about 1.03 to about 1.05 at 25° C.

7. An ink as defined in claim 1, wherein said humectant is selected from the group consisting of ethylene glycol; 1,2-propanediol; and 1,3-propanediol.

8. An ink as defined in claim 1, wherein said compatible dye comprises Direct Black No. 154.

* * * * *